United States Patent [19]

Nakasugi et al.

[11] Patent Number: 5,270,737
[45] Date of Patent: Dec. 14, 1993

[54] LIGHT DEFLECTING APPARATUS

[75] Inventors: Mikio Nakasugi, Chofu; Hirofumi Hori, Yokohama, both of Japan

[73] Assignee: Canon Kabushiki Kaisha, Tokyo, Japan

[21] Appl. No.: 661,231

[22] Filed: Feb. 27, 1991

[30] Foreign Application Priority Data

Feb. 27, 1990 [JP] Japan .................................. 2-044528
Aug. 28, 1990 [JP] Japan .................................. 2-226997

[51] Int. Cl.$^5$ ............................................. G01D 15/16
[52] U.S. Cl. ..................................... 346/108; 384/107
[58] Field of Search ............... 346/108, 107 R, 160; 384/107, 108, 109, 111, 112, 113, 114, 115, 118, 121, 123, 901, 903

[56] References Cited

U.S. PATENT DOCUMENTS

| | | | |
|---|---|---|---|
| 2,977,164 | 3/1961 | Witte | 308/217 |
| 3,048,453 | 8/1962 | Scott | 308/36.2 |
| 3,778,123 | 12/1973 | Hendler et al. | 308/36.3 |
| 3,913,989 | 10/1975 | Williams | 384/123 |
| 4,892,418 | 1/1990 | Asada et al. | 384/124 |
| 4,919,549 | 4/1990 | Lawson et al. | 384/113 |
| 5,018,880 | 5/1991 | Nakasugi et al. | 384/112 |

FOREIGN PATENT DOCUMENTS

| | | |
|---|---|---|
| 117873 | 9/1983 | European Pat. Off. . |
| 306352 | 3/1989 | European Pat. Off. . |
| 3527781 | 2/1987 | Fed. Rep. of Germany . |
| 1057616 | 2/1967 | United Kingdom . |
| 2115082 | 9/1983 | United Kingdom . |

OTHER PUBLICATIONS

Machine Design, vol. 30, No. 13, Jun. 26, 1958, p. 97.

*Primary Examiner*—Mark J. Reinhart
*Attorney, Agent, or Firm*—Fitzpatrick, Cella, Harper & Scinto

[57] ABSTRACT

A light deflecting apparatus for deflecting a light flux are provided with a shaft, a deflector, a sleeve, a projecting member and driving device. The deflector is attached to the shaft and is adapted to deflect the light flux. The sleeve is rotatably fitted to the shaft and has a concave portion in a portion which is fitted to the shaft. The projecting member is adapted to be fitted into the concave portion of the sleeve. The shaft is rotated by the driving device. By such the construction, it is prevented that the deflector attached to the shaft is lifted up or pulled out from the fixed member than it is needed.

29 Claims, 5 Drawing Sheets

LIGHT DEFLECTING APPARATUS

BACKGROUND OF THE INVENTION

1. Field of the Invention

The present invention relates to a rotating apparatus which is used in a light deflecting apparatus for use in a laser beam printer or the like.

2. Related Background Art

In recent years, there has been an increasing demand regarding a rotating apparatus to rotate at a high speed or a high accuracy increasing. Particularly, in a light deflecting apparatus which is used in a laser beam printer, a dynamic pressure bearing which rotates in a contactless manner is used to obtain a high accuracy rotating apparatus. FIG. 1 shows a deflection scanning rotating apparatus of a laser beam printer using a dynamic pressure bearing. A rotary shaft 1 is rotatably fitted into a sleeve 2. A thrust plate 3 is arranged together with a fixed plate 4 to a lower edge portion of the sleeve 2 and fixed to an outer cylinder 5.

A flange 6 is fixed to the rotary shaft 1. A rotary polygon mirror 7 to deflect a light flux is fixed to an upper portion of the flange 6. A yoke 9 in which a driving magnet 8 is fixed to the inner peripheral surface is fixed to a lower portion of the flange 6. A stator 10 is fixed to the outer cylinder 5 arranged at a position where it faces the driving magnet 8. A shallow groove 11 is formed on the surface of the thrust plate 3 at a position which faces an edge portion of the rotary shaft 1, thereby forming a dynamic pressure thrust bearing. A hole 12 and a groove 13 to circulate a lubricating fluid are also formed. A herringbone-shaped shallow groove 14 is formed on an outer peripheral surface of the rotary shaft 1 at a position which faces an inner peripheral surface of the sleeve 2, thereby forming a dynamic pressure radial bearing. Further, a spiral shallow groove 15 is formed near the sleeve opening portion so as to allow the lubricating fluid to flow in the dynamic thrust bearing. A concave portion 16 is formed in the sleeve 2 at a position between the herringbone shallow groove 14 and the spiral shallow groove 15 and a small diameter hole 17 is also formed, thereby assuring the stability of the dynamic pressure bearing using a fluid (oil, grease, or the like) as a lubricating fluid.

However, the above conventional apparatus has the following drawbacks in order to assure the stable dynamic pressure bearing. That is, after the dynamic pressure bearing has been assembled, when a shock or the like acts on the rotary polygon mirror as a rotary member, the rotary member is lifted up and air is mixed into the lubricating agent (oil, grease, or the like). Thus, there is a case where the stable characteristics as a dynamic pressure bearing rotating apparatus cannot be obtained. On the other hand, when the rotary member is unexpectedly lifted up, the rotary member is pulled out of the fixed member. Therefore, a handling performance of the dynamic pressure bearing after completion of assembly is troublesome.

SUMMARY OF THE INVENTION

The invention is made in consideration of the drawbacks of the conventional techniques mentioned above and it is an object of the invention to provide a light deflecting apparatus using a dynamic pressure bearing in which a rotary polygon mirror as a rotary member and a fixed member are mutually certainly coupled.

To accomplish the above object, according to the invention, a concave portion is formed on a fitting surface of either one of a shaft and a sleeve and a member adapted to be fitted into the concave portion in a contactless manner is attached to the other, thereby preventing that the rotary member attached to the shaft is lifted up or pulled out from the fixed member.

To accomplish the above object, according to the invention, a concave portion is formed on a rotary shaft, a projecting member which is fitted into the concave portion in a contactless manner is provided for a sleeve, and the projecting member has a shape such that when the shaft is inserted into the sleeve, the projecting member can be easily deformed and inserted and, on the contrary, the projecting member has a hook in the pulling-out direction and is difficult to be pulled out. Thus, it is prevented that the rotary member attached to the rotary shaft is lifted up or pulled out from the fixed member than it is needed.

DETAILED DESCRIPTION OF THE PREFERRED EMBODIMENTS

Figure 1:
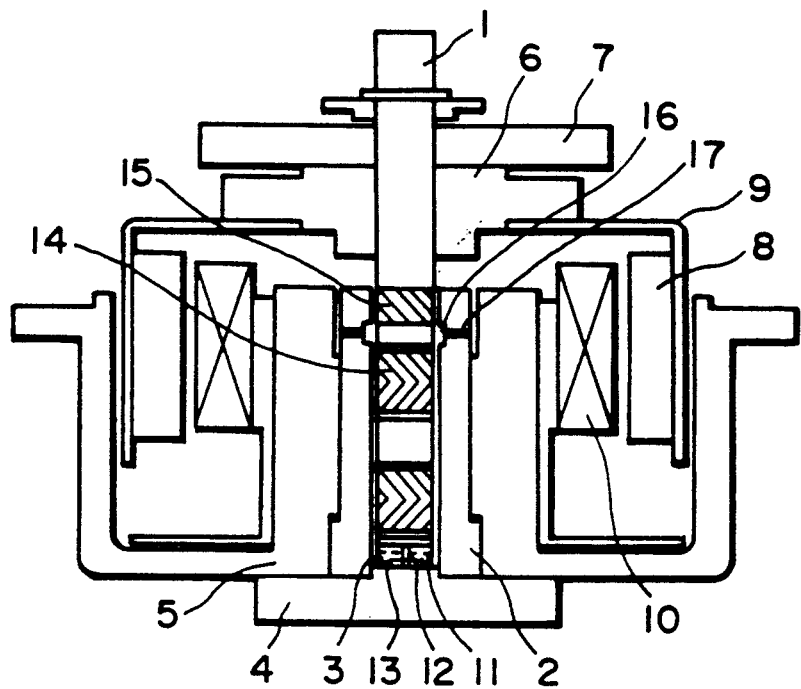
FIG. 1 is a cross sectional view of a light deflecting apparatus using a conventional dynamic pressure bearing.
Figure 2:
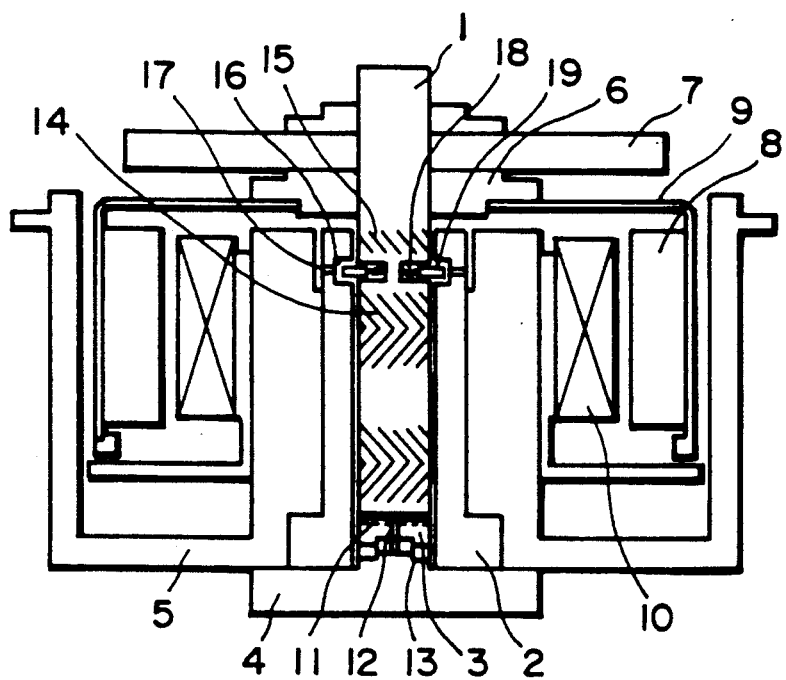
FIG. 2 is a cross sectional diagram of the first embodiment of a light deflecting apparatus using a dynamic pressure bearing of the invention.

FIG. 2 is a diagram showing the first embodiment of a light deflecting apparatus using a dynamic pressure bearing of the invention. The parts and components having the same functions as those shown in FIG. 1 are designated by the same reference numerals and their descriptions are omitted.

Figure 3:
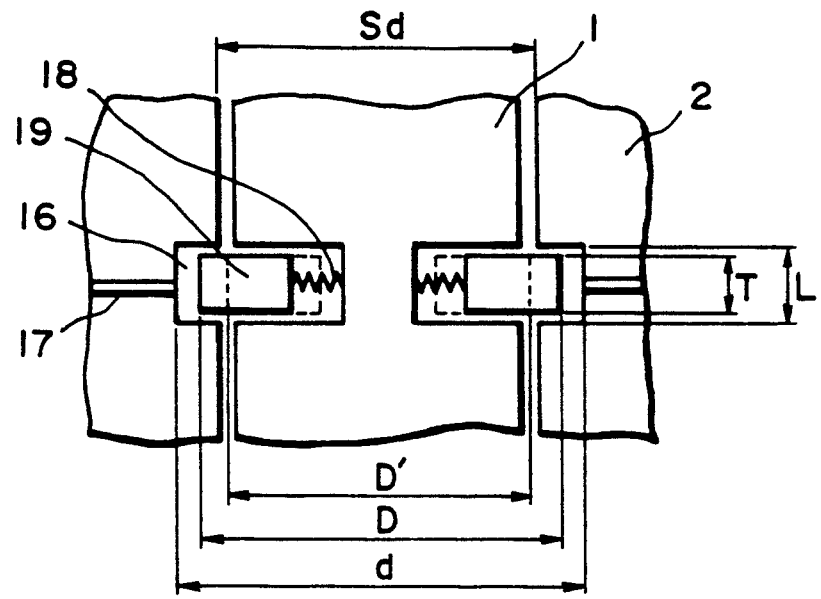
FIG. 3 is a partial detailed diagram for explaining a dimensional relation in the embodiment shown in FIG. 2.

The rotary shaft 1 is rotatably fitted into the sleeve 2. The concave portion 16 is formed on the sleeve 2 at a position corresponding to a portion between the herringbone shallow groove 14 which is formed on the rotary shaft 1 and is used to form a dynamic pressure radial bearing and the spiral shallow groove 15 for allowing the lubricating fluid to flow on the side of the dynamic pressure thrust bearing. A plurality of projecting members are attached to the rotary shaft 1 at positions between the shallow grooves 14 and 15 through an elastic material or a spring member 18. As shown in FIG. 3, in a state in which no load is applied to the spring member 18 and in a state in which a centrifugal force due to the rotation is applied, an outer diameter corresponding amount D of the projecting member 19 is smaller than an inner diameter d of the concave portion 16 and is larger than an inner diameter Sd of the sleeve 2. On the other hand, by applying a force in the radial direction to the projecting member 19, the spring member 18 is compressed and an outer diameter corresponding amount D' is set to be smaller than the sleeve inner diameter Sd. Further, a thickness T of projecting member 19 is smaller than a length L in the axial direction of the concave portion 16. Since the projecting member 19 is attached to the rotary shaft, it is desirable to attach a plurality of projecting member 19 so as not to cause a dynamic unbalance. Therefore, upon assembly, the thrust plate 3 is fixed to the sleeve 2 through the fixed plate 4. A predetermined amount of lubricating oil is injected into the bottom portion of the sleeve 2. A degassing process is executed to eliminate air bubbles existing in the hole 12 and groove 13 and the like formed on the thrust plate 3. After that, the rotary shaft 1 is inserted. When inserting the rotary shaft 1, the projecting member 19 compresses the spring member 18 in an opening portion of the sleeve 2 and is released when the spring member 18 reaches the concave portion 16. In such an assembled state, even if a force acts on the rotary shaft 1 in a direction such as to be pulled out from the sleeve 2, there is no fear such that the rotary shaft is lifted up and the air is mixed into the lubricating oil or that the rotary shaft is pulled out from the sleeve. Further, the rotation, since the outer diameter D and thickness T of the projecting member 19 are smaller than the inner diameter d of concave portion 16 and the length L in the axial direction of the concave portion, the rotary shaft can rotate in a contactless manner. A stable dynamic pressure bearing rotating apparatus can be obtained.

In the above description, the projecting member 19 is provided at the same position as that of the concave portion to assure the stability of the lubricating fluid. However, a similar effect can be also obtained by additionally forming a concave portion to another location of the sleeve 2 and by providing the projecting member 19 and spring member 18 at positions corresponding to the rotary shaft 1.

Although the embodiment has been described with respect to the case of the shaft rotation, a similar effect can be also derived in the case of the sleeve rotation. In such a case, it is sufficient to use one projecting member because an influence by the projecting member on the dynamic unbalance upon rotation is eliminated.

As described above, the light deflecting apparatus using the dynamic pressure bearing of the invention comprises: the shaft which is mutually rotatably fitted; the deflector attached to the shaft; and the sleeve, wherein a dynamic pressure generating groove is formed on the fitting surface of at least one of the shaft and the sleeve, a concave portion is formed on the side of one of the shaft and the sleeve, and a projecting member having a shape which can be fitted into the concave portion in a contactless manner is provided on the other side.

The projecting member is attached to the shaft or the sleeve through the elastic means.

Figure 4:
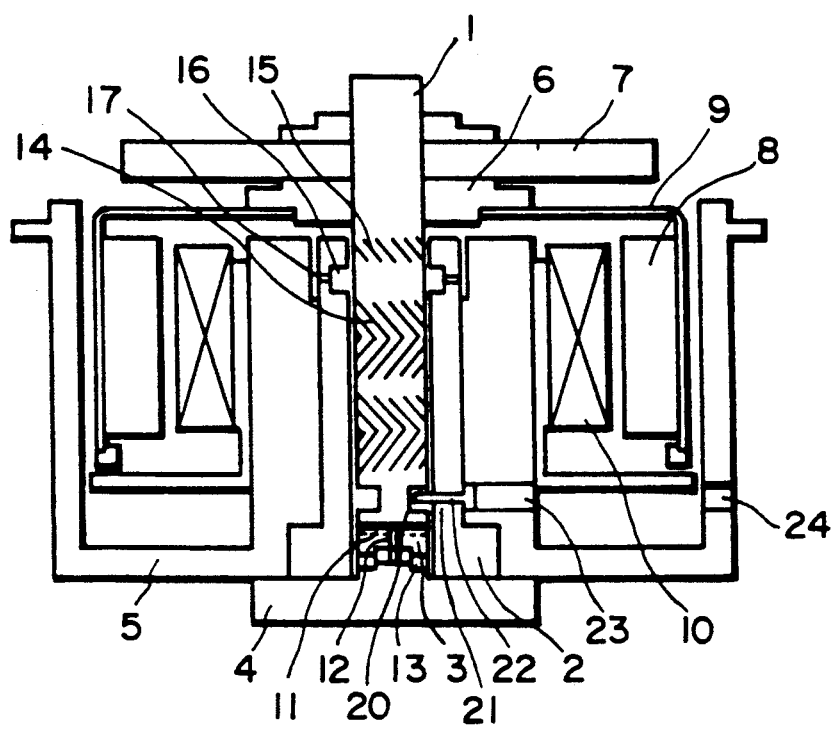
FIG. 4 is a cross sectional diagram of the second embodiment of the invention.

FIG. 4 is a diagram showing the second embodiment of the invention. A concave portion 20 is formed on a radial surface of the rotary shaft 1 at a position near the edge portion on the side of the thrust bearing (lower side in the diagram). A hole 21 is formed in the sleeve 2 at a position which faces the concave portion 20. A projecting member 22 which is fitted into the concave portion 20 in a contactless manner is attached to the hole 21. Since the projecting member 22 is fitted into the hole 21 at the final stage in the assembling steps, auxiliary holes 23 and 24 are formed in the outer cylinder 5. On the other hand, since the concave portion 20 is formed on the closed side of the sleeve 2, when the rotary shaft 1 is inserted into the sleeve 2 or when the lubricating oil is degassed, there is a fear of leakage of the lubricating oil from the hole 21 formed in the sleeve 2. Therefore, it is desirable to previously attach the projecting member 22 into the hole 21 so as not to project to the inner peripheral surface of the sleeve 2. Further, in the above state, if a liquid seal material or the like is coated onto the sleeve outer peripheral surface side of the projecting member 22, the leakage of the lubricating oil can be certainly prevented.

Although the embodiment has been described with respect to the case where the concave portion 20 of the rotary shaft 1 is formed near the edge portion on the thrust bearing side, the concave portion 20 can be formed at an arbitrary position and a similar effect is derived.

Although the embodiment has been described with respect to the case of the shaft rotation, a similar effect can be also obtained in the case of the sleeve rotation. In this case, since there is a fear of occurrence of the dynamic unbalance upon rotation, it is desirable to attach a plurality of projecting members.

Figure 5:
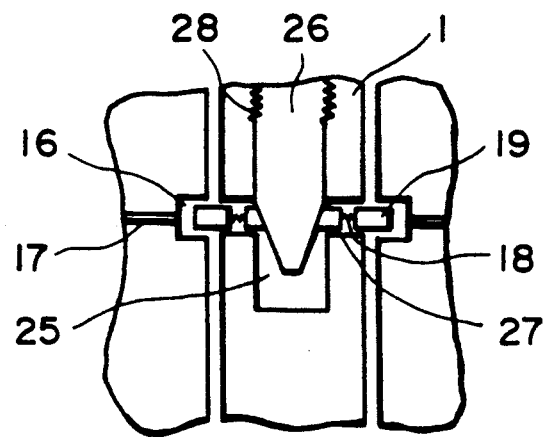
FIG. 5 is a constructional diagram of a main section of the third embodiment of the invention.

FIG. 5 is a diagram showing the third embodiment of the invention. A hole 25 is formed in the rotary shaft 1 in the axial direction from the upper portion until a position which reaches the projecting member 19. A shaft member 26 having a tapered tip is fitted into the hole 25. A tapered member 27 is attached to the projecting member 19 through the spring member 18 so as to become into engagement with the tapered tip portion of the shaft member 26. When the shaft member 26 is pushed into the hole 25, the projecting member 19 is projected and inserted into the concave portion 16 in a contactless manner. When the shaft member 26 is lifted up, the projecting member 19 is pulled in by the compression of the spring. Therefore, since the projecting member 19 can be pulled out or inserted by inserting or pulling out the shaft member 26, so that the projecting member can be used as necessary. If the shaft member 26 is coupled to the rotary shaft 1 by a screw 28, the shaft member 26 can be also easily inserted or pulled out and can be also easily fixed. The shaft member 26 can be also used even if the spring member 18 is detached. Even in such a case, the effect of the invention is not lost.

As described above, the concave portion is formed on the fitting surface of either one of the shaft and the sleeve in the dynamic pressure bearing and the member which is fitted into the concave portion in a contactless manner is attached to the other. Thus, it is possible to prevent that the rotary member attached to the shaft is lifted up or pulled out from the fixed member than it is needed. The dynamic pressure bearing after completion of the assembly can be easily handled.

Figure 6:
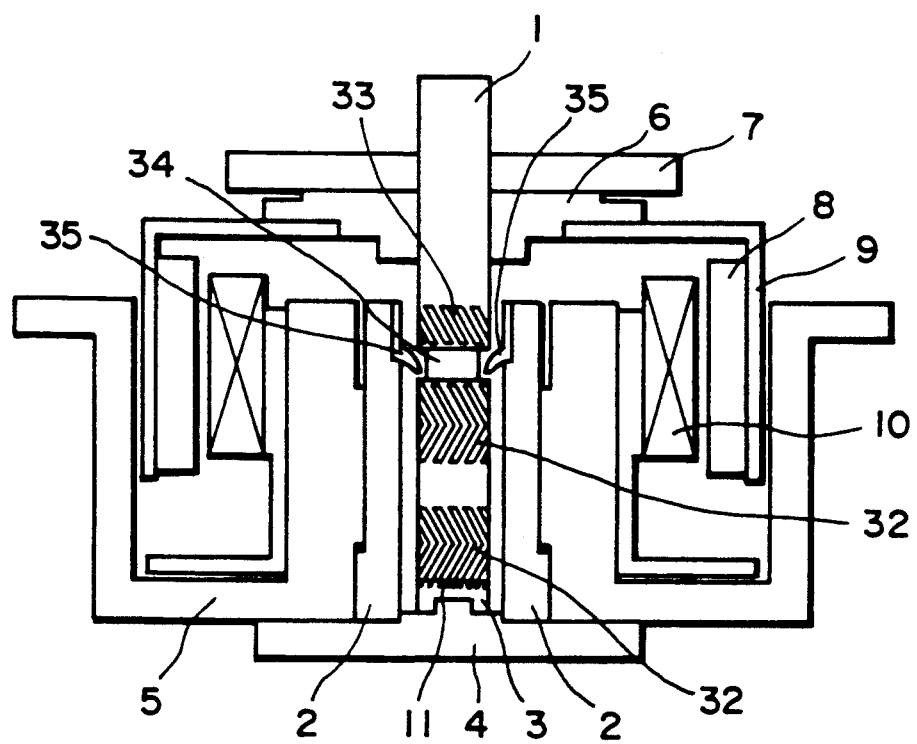
FIG. 6 is a diagram for explaining the fourth embodiment of a light deflecting apparatus using a dynamic pressure fluid bearing of the invention.

FIG. 6 shows the fourth embodiment of a light deflecting apparatus using the dynamic pressure fluid bearing of the invention.

The rotary shaft 1 is rotatably inserted into the fixed sleeve 2. The thrust plate 3 is arranged together with the fixed plate 4 in the lower edge portion of the sleeve 2 and is fixed to the outer cylinder 5. The flange 6 is fixed to the rotary shaft 1. The rotary polygon mirror 7 as a deflecting mirror which is used to deflect and scan a light flux is fixed to the upper portion of the flange 6. The yoke 9 in which the driving magnet 8 is fixed to the inner peripheral surface is fixed to the lower portion of the flange 6. The stator 10 fixed to the outer cylinder 5 is arranged at a position which faces the driving magnet 8. The shallow groove 11 is formed on the surface of the thrust plate 3 which faces the edge portion of the rotary shaft 1, thereby forming a dynamic pressure thrust bearing. A herringbone-shaped shallow groove 32 is formed on the outer peripheral surface of the rotary shaft 1 at a position which faces the inner peripheral surface of the sleeve 2, thereby forming a dynamic pressure radial bearing. Further, a spiral shallow groove 33 so as to allow a lubricating fluid to flow in the dynamic pressure thrust bearing is formed in a portion near the sleeve opening portion. A concave portion 34 is formed on the rotary shaft 1 at a position between the herringbone shallow groove 32 and the spiral shallow groove 33. A projecting member 35 is provided for the sleeve 2. The projecting member 35 has a shape such that it is fitted into the concave portion 34 in a contactless manner and can be easily deformed and inserted into the concave portion 34 when the shaft is inserted and that it has a hook in the pulling-out direction of the shaft and is difficult to be pulled out. A plurality of projecting members can be formed around the rotary shaft or the continuous projecting member having no cut portion can be also formed on the whole peripheral surface of the shaft.

According to the invention, upon assembly, the thrust plate 3 is fixed to the sleeve 2 through the fixed plate 4, a predetermined quantity of lubricating fluid is injected into the bottom portion of the sleeve 2, and the rotary shaft is inserted into the sleeve. Upon insertion of the rotary shaft, the projecting member is deformed and doesn't obstruct the insertion of the rotary shaft until the concave portion 34 reaches a position corresponding to the projecting member. However, when the concave portion has reached the position of the projecting member, the deformation of the projecting member is returned to the original state and is come into engagement with the concave portion. By pushing the rotary shaft into the sleeve as mentioned above, the above parts can be easily assembled. After completion of the assembly, it is possible to prevent that the projecting member is come into engagement with the concave portion and is lifted up than it is needed or is pulled out when a force such as to pull out the rotary shaft from the sleeve is applied. Therefore, after completion of the assembly, the apparatus can be also easily handled.

As described above, the light deflecting apparatus using the dynamic pressure fluid bearing of the invention comprises the shaft which is mutually rotatably fitted; the deflector attached to the shaft; and the sleeve, wherein a dynamic pressure generating groove is formed on at least one of the shaft and the sleeve, a concave portion is formed on the shaft, the projecting member which is fitted into the concave portion in a contactless manner is provided on the sleeve side, and the projecting member has a shape such that it is easily deformed and inserted when the shaft is inserted into the sleeve and that, on the contrary, it has a hook in the sleeve pulling-out direction and is difficult to be pulled out.

The parts and components having the same functions as those shown in FIG. 6 are designated by the same reference numerals hereinlater and their descriptions are omitted.

Figure 7:
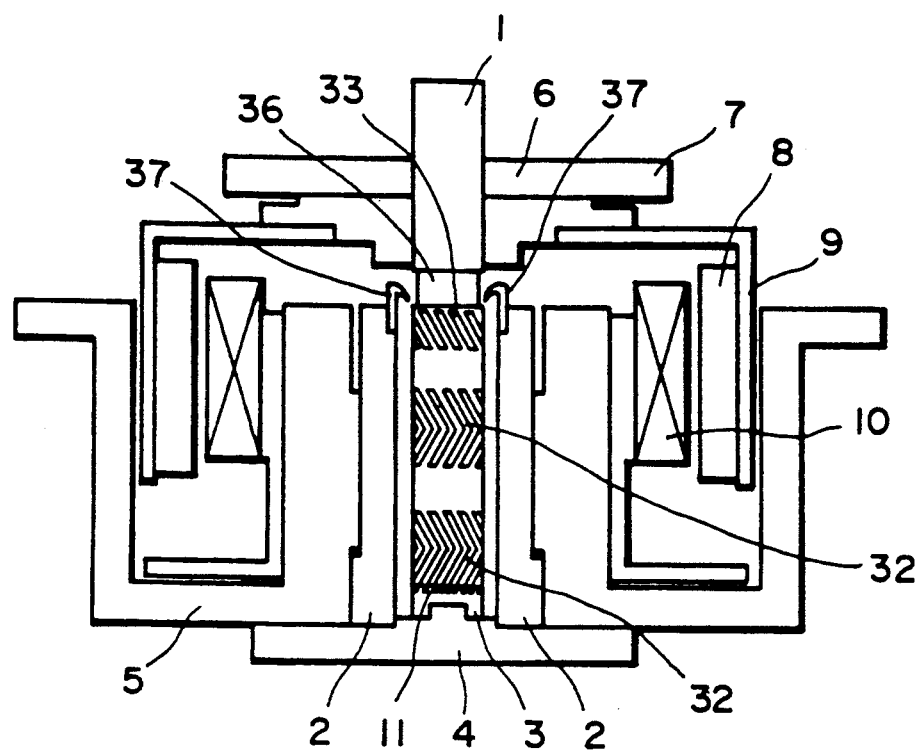
FIG. 7 is a diagram for explaining the fifth embodiment of a light deflecting apparatus using a dynamic pressure fluid bearing of the invention.

FIG. 7 is a diagram showing the fifth embodiment of a light deflecting apparatus using the dynamic pressure fluid bearing of the invention.

A concave portion 36 is formed in the upper portion of the spiral shallow groove 33 of the rotary shaft 1. A projecting member 37 which is fitted into the concave portion 36 in a contactless manner is provided for the sleeve 2. The projecting member 37 has a shape such that is can be easily deformed and inserted into the concave portion when the shaft is inserted and that it has a hook in the sleeve pulling-out direction and is difficult to be pulled out. The projecting member 37 has a continuous shape for the whole surface of the rotary shaft and doesn't have any cut portion.

In the fifth embodiment, the concave portion and the projecting member for the whole surface of the shaft are provided in the opening portion of the sleeve.

In the conventional dynamic pressure fluid bearing, there is a fear such that the lubricating fluid is dispersed from the sleeve opening portion upon actuation or the like and the dispersed lubricating fluid is adhered onto the surfaces of the motor component parts, rotary polygon mirror 7, and the like, and the characteristics or performance of the deflecting scanning apparatus is lost. Further, there is also a case where the lubricating fluid is reduced by the dispersing, so that a deterioration of the bearing characteristics or a damage of the bearing is caused. Therefore, according to the construction of the embodiment, it is possible to prevent that the rotary shaft is lifted up or pulled out from the sleeve than it is needed. It is prevented by the projecting member 37 that the lubricating fluid is dispersed. The stable bearing is obtained.

Figure 8:
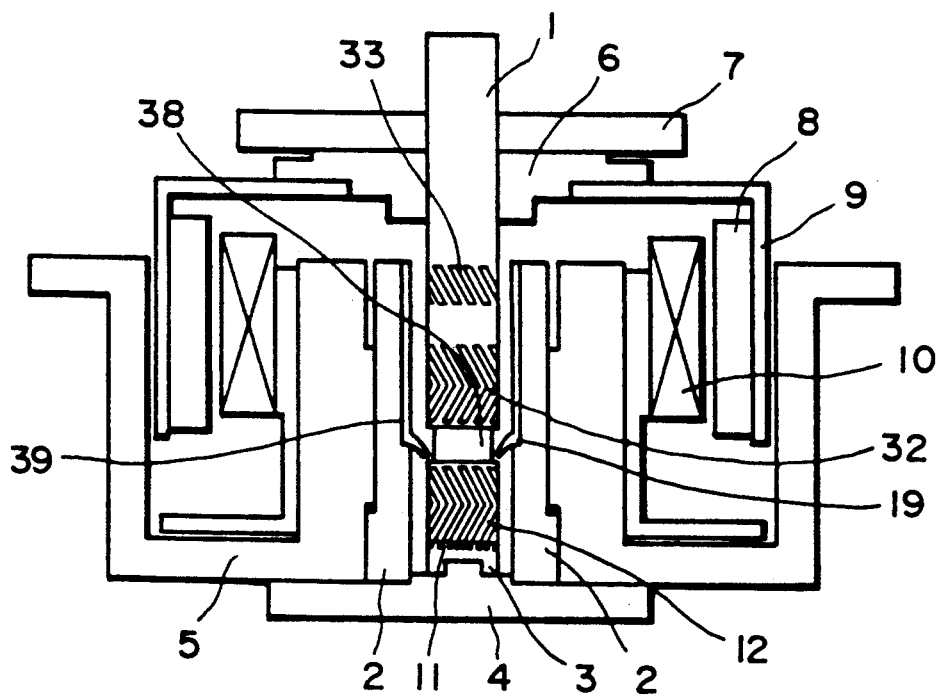
FIG. 8 is a diagram for explaining the sixth embodiment of a light deflecting apparatus using a dynamic pressure fluid bearing of the invention.

FIG. 8 is a diagram showing the sixth embodiment of a light deflecting apparatus using the dynamic pressure fluid bearing of the invention.

A position of a concave portion 38 formed on the rotary shaft 1 is largely provided between two herringbone shallow grooves 32 constructing a radial bearing. A projecting member 39 which is fitted into the concave portion 38 in a contactless manner and is provided for the whole peripheral surface of the shaft is provided for the sleeve 2.

Figure 9:
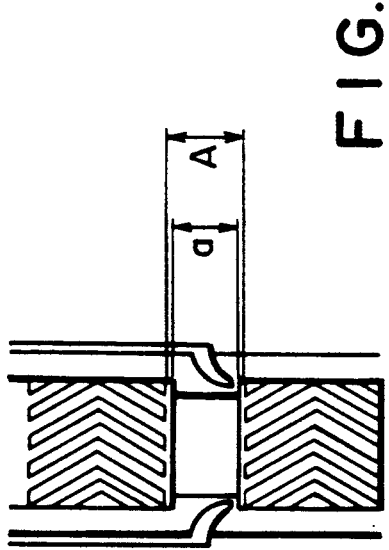
FIG. 9 is an enlarged diagram of a portion near a concave portion in the sixth embodiment.

According to the invention, by providing the concave portion into the lubricating fluid in a manner such that a width a is smaller than a width A but has a value as large as possible as shown in FIG. 9, it is prevented that the rotary shaft is lifted up or pulled out from the sleeve that it is needed. The lubricating fluid can smoothly flow. The loss of lubricating fluid can be reduced. On the other hand, since an amount of lubricating fluid in the bearing increases, a thermal capacity increases, so that a change in temperature of the lubricating fluid decreases and the stable bearing characteristics can be obtained.

As described above, the concave portion is formed on the rotary shaft and the projecting member which is fitted into the concave portion in a contactless manner and is elastically deformed when the shaft is inserted is provided for the sleeve. Thus, the rotary shaft can be fitted into the sleeve by merely inserting the rotary shaft upon assembly. After completion of the assembly, it is possible to prevent that the rotary shaft is lifted up from the sleeve than it is needed and that the rotary shaft is unexpectedly pulled out of the sleeve. Thus, there is an effect such that the apparatus after completion of the assembly can be easily handled.

In a scanning optical apparatus which is used in a laser beam printer, a laser facsimile apparatus, or the like, a photo sensitive drum is scanned by a light flux which was deflected and scanned by a deflector, thereby forming an electrostatic latent image. The latent image is developed to a toner image by a developing apparatus. The toner image is copy transferred to a recording paper. Then, the toner is heated and fixed to recording paper after the transfer of the toner image by a fixing apparatus, so that the image is printed.

Figure 10:
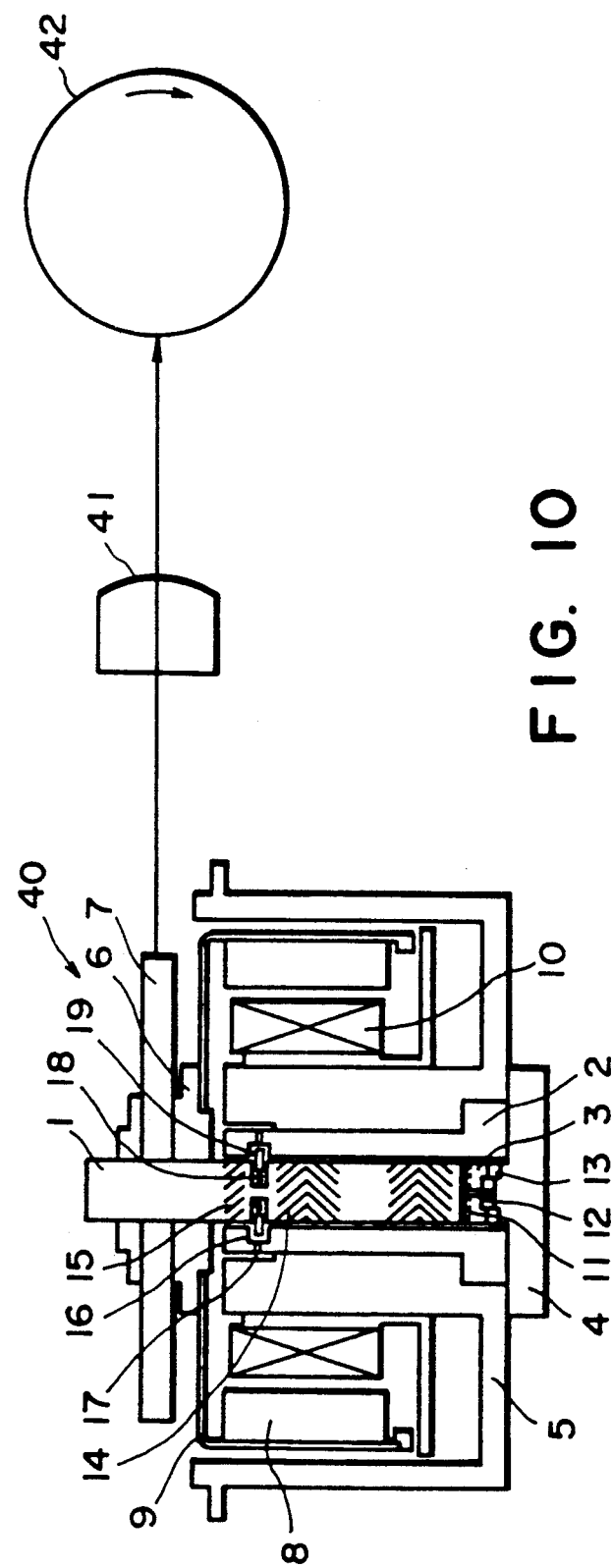
FIG. 10 is a diagram for explaining a construction of a scanning optical apparatus using a dynamic pressure rotary bearing of the invention.

FIG. 10 shows a diagram for explaining a construction of a scanning optical apparatus which uses the dynamic pressure rotary bearing of the invention and is used to scan a photo sensitive drum by a light flux.

The scanning optical apparatus comprises: a light source apparatus including a semiconductor laser apparatus, a collimating lens system, and the like; a light deflecting apparatus 40 for deflecting the light flux which is generated from the light source apparatus; an fθ lens 41; and the like. The light flux which was deflected and reflected by the light deflecting apparatus 40 is irradiated to a photo sensitive drum 42 through the fθ lens 41.

The light deflecting apparatus 40 is constructed as described in FIG. 2.

The main scan of the photo sensitive drum 42 by the light flux is executed by the rotation of the rotary polygon mirror 7. The sub scan is performed by rotating the photo sensitive drum 42 along a path around the axial line of the cylinder. An electrostatic latent image is formed on the surface of the photo sensitive drum 42 as mentioned above.

Around the photo senstive drum 42, there are arranged: a corona discharging device to uniformly charge the surface of the photo sensitive drum 42; a developing apparatus to develop the electrostatic latent image formed on the surface of the photo sensitive drum 42 to a toner image; a transfer corona discharging apparatus to copy transfer the toner image onto a recording paper; and the like. Those components are not shown in the diagram. Recording information corresponding to the light flux which is generated from the light source apparatus is printed onto the recording paper by the operations of those components.

The dynamic pressure rotary bearing of the invention in the embodiments other than the embodiment described in FIG. 2 can be obviously used as a light deflecting apparatus 40.

By using the construction as described above, it is possible to provide a scanning optical apparatus which is used in a high accurate laser beam printer, a laser facsimile apparatus, or the like in order to obtain a high accurate rotating apparatus.

We claim:

1. A light deflecting apparatus for deflecting a light flux, comprising:
   a shaft;
   a deflector which is attached to the shaft and which deflects the light flux;
   a sleeve which is rotatably fitted to the shaft and which has a concave portion at a portion where the sleeve is fitted to the shaft;
   a projecting member which is fitted into the concave portion; and
   driving means for rotating the shaft.

2. An apparatus according to claim 1, wherein the projecting member is fitted into the concave portion in a contactless manner.

3. An apparatus according to claim 1, wherein the projecting member is attached to the shaft.

4. An apparatus according to claim 3, wherein the projecting member is attached to the shaft through an elastic member.

5. A light deflecting apparatus for deflecting a light flux, comprising:
   a sleeve;
   a shaft which is rotatably fitted into the sleeve and which has a concave portion at a portion where the shaft is fitted into the sleeve;
   a deflector which is attached to the shaft and which deflects the light flux;
   a projecting member which is fitted into the concave portion; and
   driving means for rotating the shaft.

6. An apparatus according to claim 5, wherein the projecting member is fitted into the concave portion in a contactless manner.

7. A light deflecting apparatus for deflecting a light flux, comprising:
   a sleeve;
   a shaft which is rotatably fitted into the sleeve and which has a concave portion at a portion where the shaft is fitted into the sleeve;
   a deflector which is attached to the shaft and which deflects the light flux;
   a projecting member which is fitted into the concave portion and which is attached to the sleeve; and
   driving means for rotating the shaft.

8. An apparatus according to claim 7, wherein the concave portion and the projecting member are formed on a whole periphery of the shaft.

9. A light deflecting apparatus for deflecting a light flux, comprising:
   a sleeve;
   a shaft which is rotatably fitted into the sleeve and which has a concave portion at a portion where the shaft is fitted into the sleeve;
   a deflector which is attached to the shaft and which deflects the light flux;
   driving means for rotating the shaft; and
   a projecting member which is fitted into the concave portion, the projecting member including a deformable hook which deforms to allow the shaft to be fitted into the sleeve and which resists the shaft from being pulled out of the sleeve.

10. An apparatus according to claim 9, wherein the shaft has the concave portion on a whole periphery.

11. An apparatus according to claim 9, wherein the concave portion and the projecting member are provided in an opening portion of the sleeve.

12. A light deflecting apparatus for deflecting a light flux, comprising:
   a sleeve;
   a shaft which is rotatably fitted into the sleeve and which has a concave portion at a portion where the shaft is fitted into the sleeve;
   a deflector which is attached to the shaft and which deflects the light flux;
   driving means for rotating the shaft; and an elastically deformable projecting member which is fitted into the concave portion and which is elastically deformed when the shaft is inserted into the sleeve.

13. A dynamic pressure bearing apparatus comprising:
a shaft
a sleeve which is rotatably fitted to the shaft and which has a concave portion at a portion where the sleeve is fitted to the shaft; and
a projecting member which is attached to the shaft through an elastic member and which is fitted into the concave portion.

14. An apparatus according to claim 13, wherein the projecting member is fitted into the concave portion in a contactless manner.

15. A dynamic pressure bearing apparatus comprising;
a sleeve;
a shaft which is rotatably fitted into the sleeve and which has a concave portion at a portion where the shaft is fitted into the sleeve; and
a projecting member which is fitted into the concave portion and which is deformed upon being fitted into the concave portion.

16. An apparatus according to claim 15, wherein the projecting member is fitted into the concave portion in a contactless manner.

17. A dynamic pressure bearing apparatus comprising;
a sleeve;
a shaft which is rotatably fitted into the sleeve and which has a concave portion at a portion where the shaft is fitted into the sleeve; and
a projecting member which is fitted into the concave portion and which is attached to the sleeve, the projecting member being deformed upon being fitted into the concave portion.

18. A dynamic pressure bearing apparatus comprising:
a sleeve;
a shaft which is rotatably fitted into the sleeve and which has a concave at a portion where the shaft is fitted into the sleeve; and
a projecting member which is fitted into the concave portion, the projecting member including a deformable hook which deforms to allow the shaft to be fitted into the sleeve and which resists the shaft from being pulled out of the sleeve.

19. An apparatus according to claim 18, wherein the shaft has the concave portion on a whole periphery.

20. An apparatus according to claim 18, wherein the concave portion and the projecting member are provided in an opening portion of the sleeve.

21. A dynamic pressure bearing apparatus comprising:
a sleeve;
a shaft which is rotatably fitted into the sleeve and which has a concave portion at a portion where the shaft is fitted into the sleeve; and
an elastically deformable projecting member which is fitted into the concave portion and which is elastically deformed when the shaft is inserted into the sleeve.

22. An image recording apparatus comprising:
a light source;
a shaft;
a deflector which is attached to the shaft and which deflects a light flux from the light source;
a sleeve which is rotatably fitted to the shaft and which has a concave portion at a portion where the sleeve is fitted to the shaft;
a projecting member which is fitted into the concave portion;
driving means for rotating the shaft; and
a photo sensitive member which receives the light flux deflected by the deflector.

23. An image recording apparatus comprising:
a light source;
a sleeve;
a shaft which is rotatably fitted into the sleeve and which has a concave portion at a portion where the shaft is fitted into the sleeve;
a deflector which is attached to the shaft and which deflects a flight flux from the light source;
a projecting member which is fitted into the concave portion;
driving means for rotating the shaft; and
a photo sensitive member which receives the light flux deflected by the deflector.

24. An image recording apparatus comprising:
a light source;
a sleeve;
a shaft which is rotatably fitted into the sleeve and which has a concave portion at a portion where the shaft is fitted into the sleeve;
a deflector which is attached to the shaft and which deflects a light flux from the light source;
a projecting member which is fitted into the concave portion and which is attached to the sleeve;
driving means for rotating the shaft; and
a photo sensitive member which receives the light flux deflected by the deflector.

25. An image recording apparatus comprising:
a light source;
a sleeve;
a shaft which is rotatably fitted into the sleeve and which has a concave portion at a portion where the shaft is fitted into the sleeve;
a deflector which is attached to the shaft and which deflects a light flux from the light source;
driving means for rotating the shaft;
a projecting member which is fitted into the concave portion, the projecting member including a deformable hook which deforms to allow the shaft to be fitted into the sleeve and which resists the shaft from being pulled out of the sleeve; and
a photo sensitive member which receives the light flux deflected by the deflector.

26. An image recording apparatus comprising:
a light source;
a sleeve;
a shaft which is rotatably fitted into the sleeve and which has a concave portion at a portion where the shaft is fitted into the sleeve;
a deflector which is attached to the shaft and which deflects the light flux from the light source;
driving means for rotating the shaft;
an elastically deformable projecting member which is fitted into the concave portion and which is elastically deformed when the shaft is inserted into the sleeve; and
a photo sensitive member which receives the light flux deflected by the deflector.

27. A light deflecting apparatus for deflecting a light flux, comprising:

a sleeve;

a shaft which is rotatably fitted into the sleeve and which has a concave portion at a portion where the shaft is fitted into the sleeve;

a deflector which is attached to the shaft and which deflects the light flux;

a projecting member which is fitted into the concave portion, the projecting member being attached near an opening portion of the sleeve; and driving means for rotating the shaft.

28. A dynamic pressure bearing apparatus comprising:

a sleeve;

a shaft which is rotatably fitted into the sleeve and which has a concave portion at a portion where the shaft is fitted into the sleeve; and a projecting member which is fitted into the concave portion and which is attached near an opening portion of the sleeve.

29. An image recording apparatus comprising:

a light source;

a sleeve;

a shaft which is rotatably fitted into the sleeve and which has a concave portion at a portion where the shaft is fitted into the sleeve;

a deflector which is attached to the shaft and which deflects light flux from the light source;

a projecting member which is fitted into the concave portion and which is attached near an opening portion of the sleeve;

driving means for rotating the shaft; and a photosensitive member for receiving the light flux deflected by the deflector.

* * * * *